(12) United States Patent
Chang et al.

(10) Patent No.: US 7,286,341 B1
(45) Date of Patent: Oct. 23, 2007

(54) ROTATABLE KEYBOARD DEVICE

(75) Inventors: Jung-Wen Chang, Lu Chu Hsiang (TW); Chun-Feng Lai, Sanchung (TW)

(73) Assignee: Quanta Computer Inc., Tao Yuan Shien (TW)

( * ) Notice: Subject to any disclaimer, the term of this patent is extended or adjusted under 35 U.S.C. 154(b) by 0 days.

(21) Appl. No.: 11/526,700

(22) Filed: Sep. 26, 2006

(30) Foreign Application Priority Data

Jun. 15, 2006  (TW) .............................. 95210474 U

(51) Int. Cl.
*G06F 1/16* (2006.01)
(52) U.S. Cl. .................. 361/680; 361/683; 400/683; 312/223.2
(58) Field of Classification Search ................ 361/680
See application file for complete search history.

(56) References Cited

U.S. PATENT DOCUMENTS

| | | | | |
|---|---|---|---|---|
| 5,055,839 A * | 10/1991 | Davis et al. | .................. | 341/22 |
| 5,241,303 A * | 8/1993 | Register et al. | ............. | 345/168 |
| 5,262,762 A * | 11/1993 | Westover et al. | ........... | 345/168 |
| 5,646,818 A * | 7/1997 | Hahn | ......................... | 361/681 |
| 6,154,925 A * | 12/2000 | Miura | ......................... | 16/338 |
| 6,587,094 B2 * | 7/2003 | Anderson | .................... | 345/168 |
| 6,700,773 B1 * | 3/2004 | Adriaansen et al. | ........ | 361/680 |
| 6,865,075 B2 * | 3/2005 | Oakley | ......................... | 361/683 |
| 2003/0184957 A1 * | 10/2003 | Stahl et al. | ................. | 361/680 |
| 2004/0056843 A1 * | 3/2004 | Lin et al. | .................... | 345/168 |
| 2004/0223295 A1 * | 11/2004 | Arbisi et al. | ................ | 361/680 |
| 2005/0195561 A1 * | 9/2005 | Smith | ......................... | 361/683 |
| 2006/0098403 A1 * | 5/2006 | Smith | ......................... | 361/683 |

* cited by examiner

*Primary Examiner*—Jayprakash Gandhi
*Assistant Examiner*—Anthony Q Edwards
(74) *Attorney, Agent, or Firm*—Rabin & Berdo, PC

(57) ABSTRACT

A keyboard device applicable on a computer device and includes a first side with a first pivoting unit and a second side with a second pivoting unit. The position of the first side is opposite to that of the second side. Both of the first side and the second side are connected with the base of the computer device via their respective pivoting unit. Therefore, the keyboard can be rotated relative to the base via the first pivoting unit and the second pivoting unit making the conversion steps from normal notebook operation status to tablet PC operation status easier and vice versa.

14 Claims, 8 Drawing Sheets

ROTATABLE KEYBOARD DEVICE

RELATED APPLICATIONS

The present application is based on, and claims priority from, Taiwan Application Serial Number 95210474, filed Jun. 15, 2006, the disclosure of which is hereby incorporated by reference herein in its entirety.

BACKGROUND

1. Field of Invention

The present invention relates to a keyboard device. More particularly, the present invention relates to a rotatable keyboard device.

2. Description of Related Art

The convertible tablet PC (personal computer) integrates a normal notebook and tablet PC in a shell. An easy way to convert a tablet PC from one operating status (such as normal notebook) to another operating status (such as tablet PC) is to directly rotate the display unit around the hinge to cover the base. Rotating the display unit uncovers the keyboard side of the base but leads to easy damage and incorrect pressing of the keyboard device.

Another method to convert the operating status of a tablet PC requires several steps. FIG. 1a~1d shows a series of continuous operation diagrams of a traditional convertible tablet PC 100. FIG. 1a shows a traditional convertible tablet PC 100 comprising a display unit 110, a base 130 and a hinge apparatus 120, wherein the base 130 is a host or a server. First, the angle between the display unit 110 and the base 130 must be large enough; second, the display unit 110 must be rotated 180 degrees along a preset rotation direction "a" to make the front face 112 of the display unit 110 face backward and the back face 114 of the display unit 110 face forwards as shown in FIGS. 1b and 1c; and finally, the display unit 110 must be pushed down in the rotation direction "c" to cover the base 130 as shown in FIG. 1d. To convert the tablet PC 100 back to its original operation status (normal notebook), a user inverses the steps above.

The main disadvantage of a traditional convertible tablet PC 110 is that these conversion steps are too complicated to use for those who are not familiar with a notebook or tablet PC.

Besides, during the second step, while rotating the display unit 110 180 degrees, the display unit 110 can only be rotated in one direction, clockwise or counterclockwise, depending on the hinge apparatus 120 (for the foregoing example, rotation direction "a" is allowed while rotation direction "b" is not allowed). In other words, the user has to remember the preset rotation direction when rotating the display unit 110 or the hinge apparatus 120 may be damaged. To solve the problem, a user could apply a little force first to test which direction is correct, however, the little force repeatedly produced over a long period would still cause damage to the hinge apparatus 120.

SUMMARY

It is therefore an aspect of the present invention to provide a keyboard device that is easy to convert for a convertible tablet PC. The keyboard device applicable on a computer device includes a first side and a second side. The position of the first side is opposite to that of the second side. Both of the first side and the second side are connected with a base of the computer device via a respective pivoting unit. Thus, the keyboard device can be rotated relative to the base via the first pivoting unit and the second pivoting unit.

The pivoting unit comprises a fastening member, a bracket and a spindle. One end of the spindle is connected to the base of the computer device and the other end crosses through a first hole of the bracket. An elastomer and a gasket are then connected with the fastening member. Besides, the spindle is hollow so electrical wires for transmitting signals between the keyboard device and the base can be passed through.

The pivoting unit further comprises a ring-shaped angle limiter with a second hole disposed between the gasket and the elastomer. The angle limiter has a stop part at the edge and the bracket has a first stop and a second stop at adequate positions such that the stop part of the angle limiter would be stopped by the first stop and the second stop from rotating.

For emphasizing and securing the positioning, the surface of the angle limiter face to the bracket has a first protrusion and a second protrusion; and their positions are opposite to the second hole (180 degrees). Besides, a first notch and a second notch are disposed around the first hole such that the first protrusion and the second protrusion would fit into the first notch and the second notch, respectively.

BRIEF DESCRIPTION OF THE DRAWINGS

These and other features, aspects and advantages of the present invention will become better understood with regard to the following description, appended claims and accompanying drawings where:

DESCRIPTION OF THE PREFERRED EMBODIMENTS

Figure 1A:
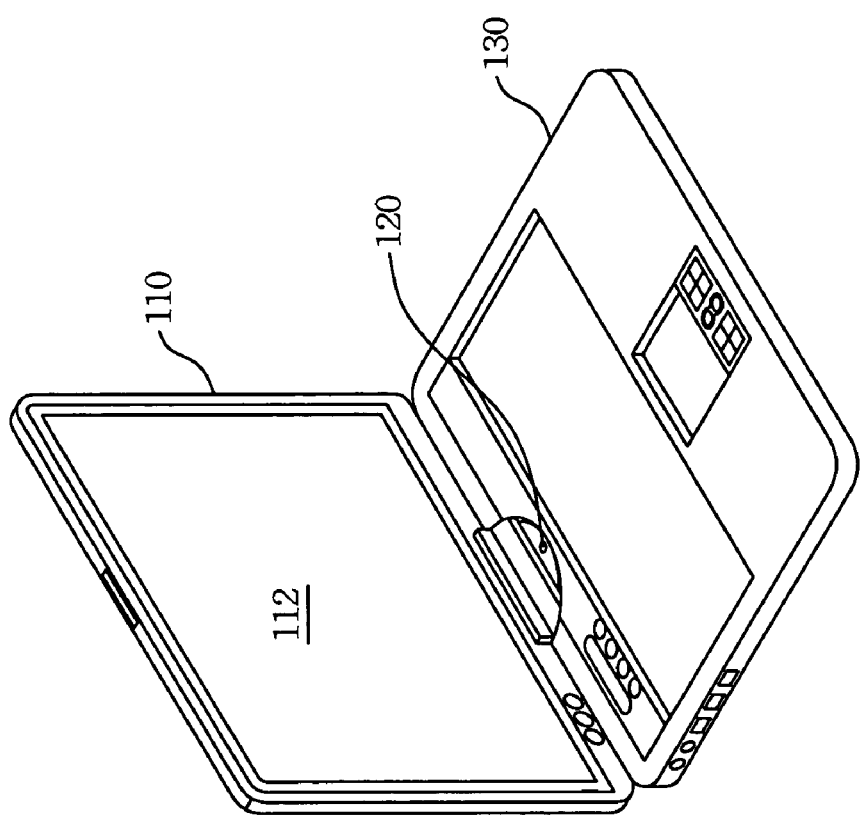
FIG. 1a~1d is a series of continuous operation diagram of a traditional convertible tablet PC.
Figure 1B:
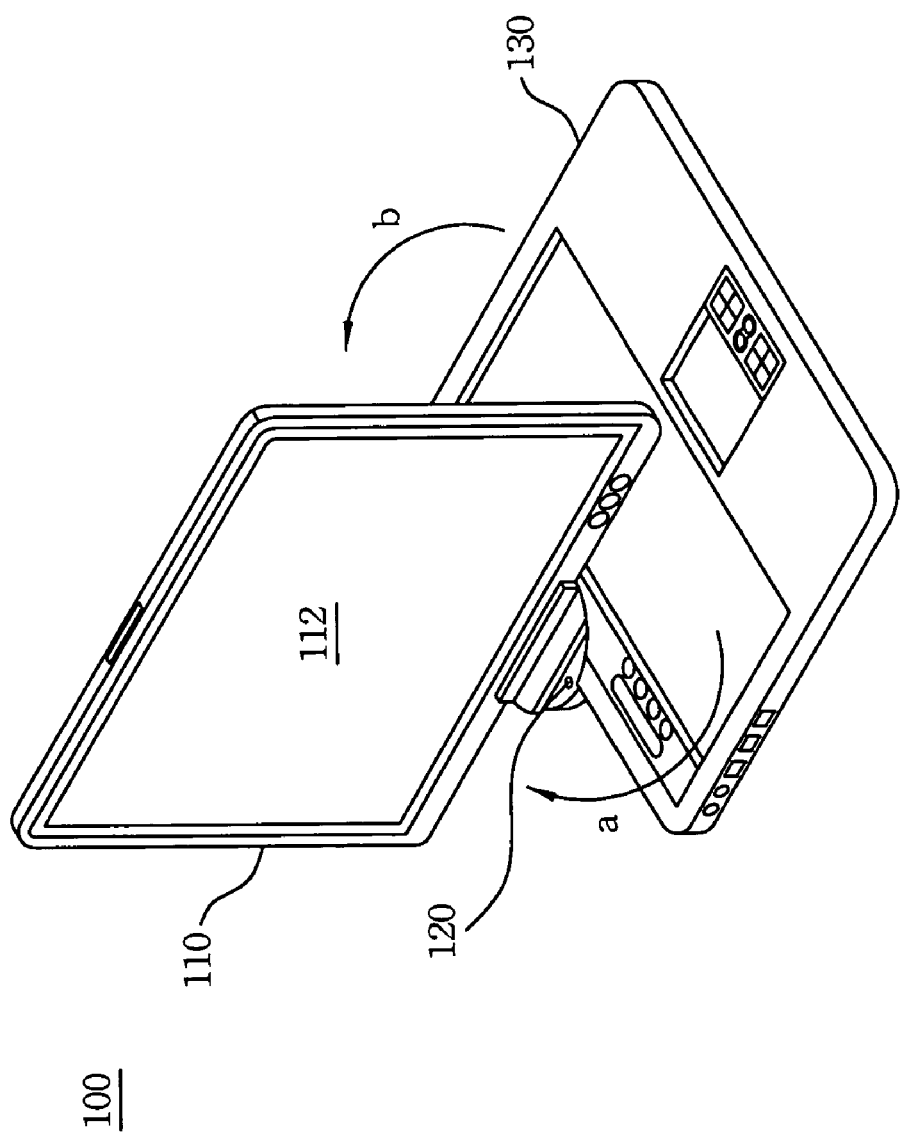
Figure 1C:
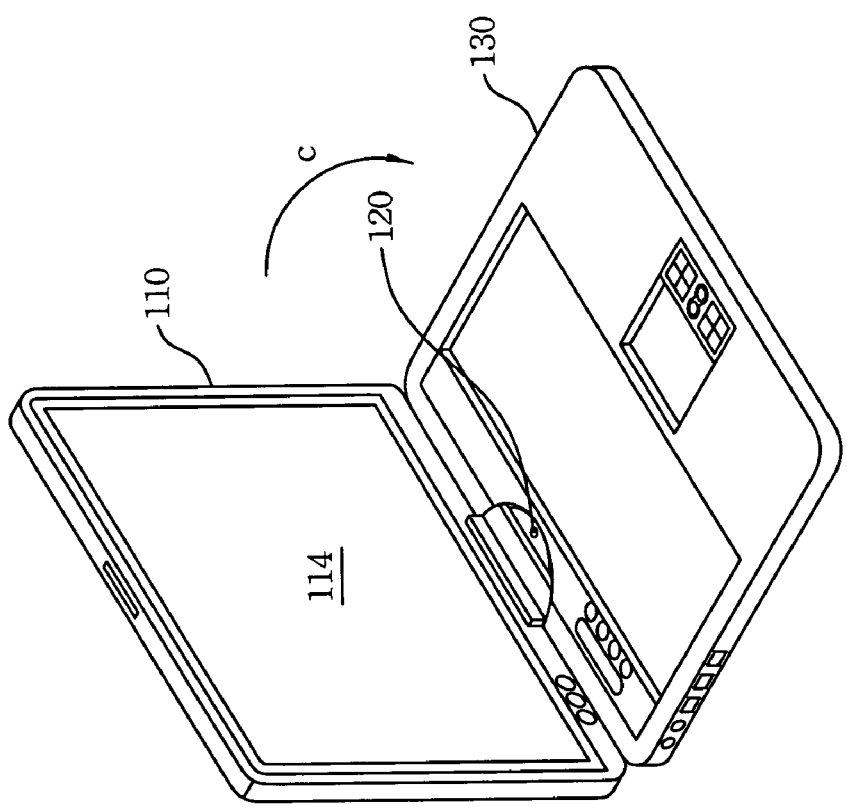
Figure 1D:
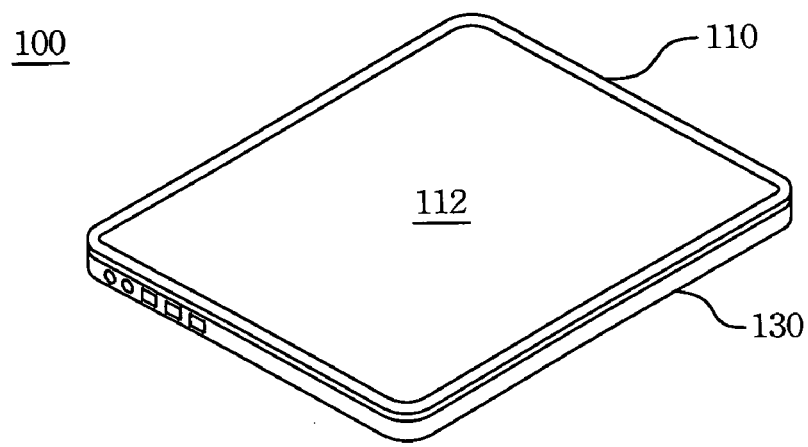
Figure 2:
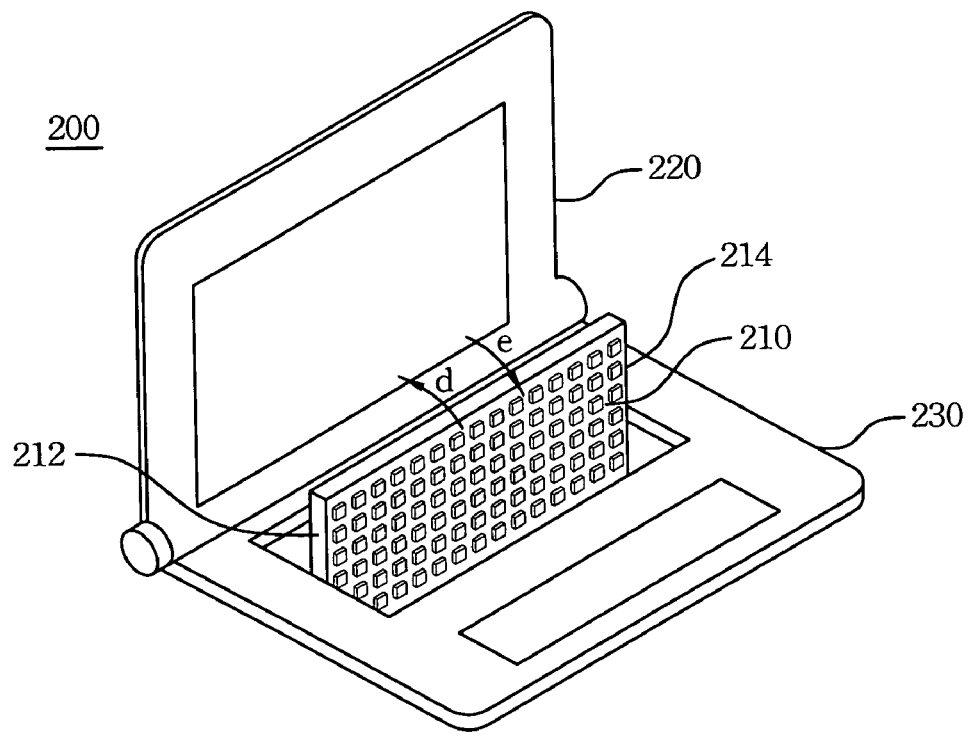
FIG. 2 is a schematic diagram of a keyboard device in accordance with a preferred embodiment of the present invention.

FIG. 2 is a schematic diagram of a keyboard device in accordance with a preferred embodiment of the present invention. In FIG. 2, a computer device 200 comprises a display unit 220, a keyboard device 210 and a base 230, wherein the display unit 220 is a touch panel and the base 230 serves as a server or a host. The base 230 has a hollow area for placing the keyboard device 210. The keyboard device 210 has a first side 212 and a second side 214 whose positions are opposite to each another; besides, both sides have a pivoting unit (not shown) to connect with the base 230 such that the keyboard device 210 is rotatable relative to the base 230 along the rotation direction "d" or "e".

Figure 3:
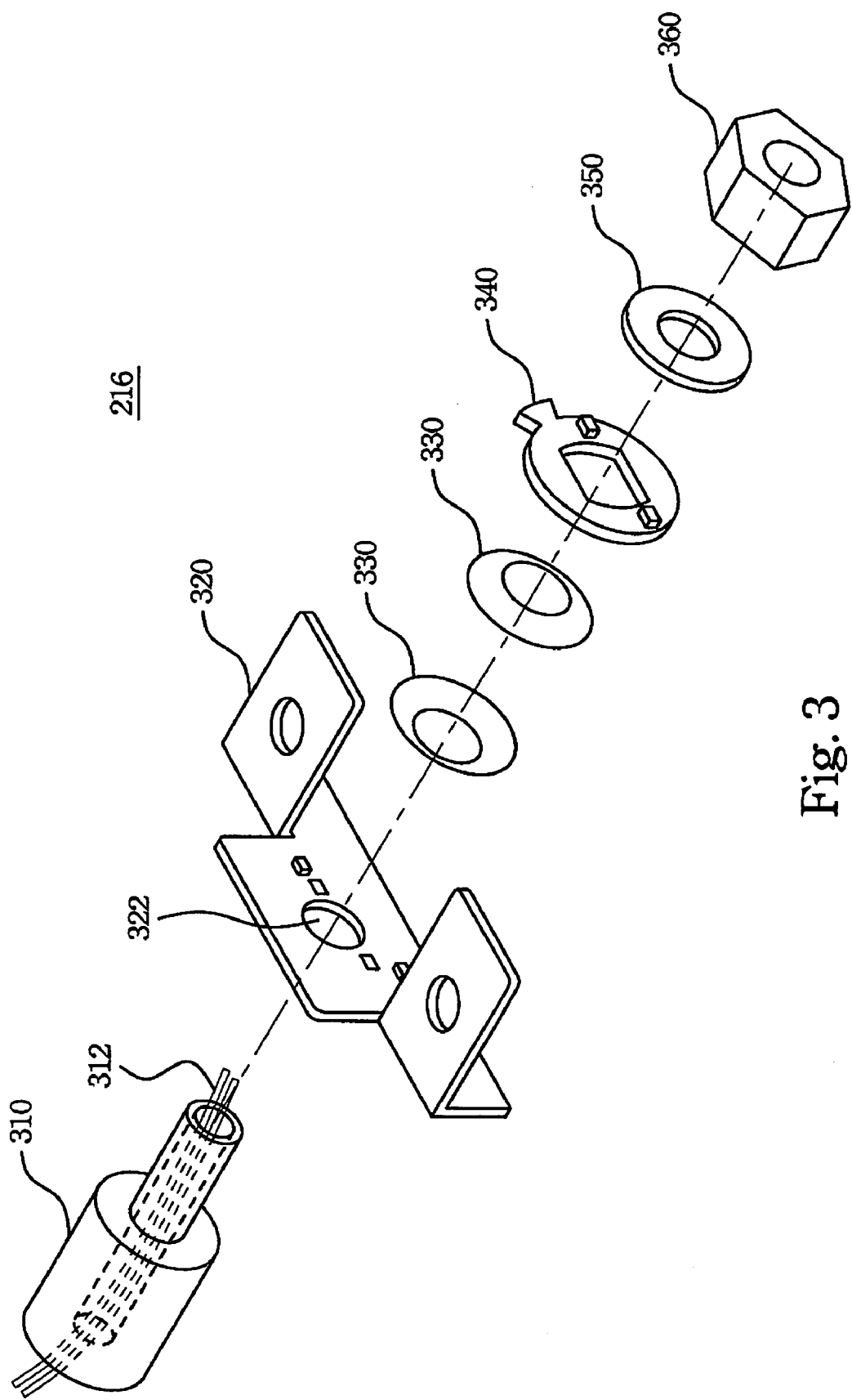
FIG. 3 is an exploded view of a pivoting unit in accordance with a preferred embodiment of the present invention.

FIG. 3 shows an exploded view of a pivoting unit mentioned above in accordance with a preferred embodiment of the present invention. A pivoting unit 216 is disposed between the first side 212 (and the second side 214) and the base 230 to make the keyboard device 210 rotate clockwise or counterclockwise, by 180 degrees. The pivoting unit 216 includes a bracket 320 with a first hole 322, a spindle 310 and a fastening member 360. One end of the spindle 310 is connected with the base 230 and the other end crosses through the first hole 322, an elastomer 330, and a gasket 350, and is connected with the fastening member 360. Each side of the bracket 320 sets a connecting portion 328 (see FIG. 4) to connect firmly with the base 230. The fastening member 360, for example, is a nut used to absorb the compression force from the fastening member 360; and the elastomer 330, for example, is a spring to provide friction (elastic force) to sustain the display unit 220 at a specific position. The tighter the fastening members 360 and the pivoting unit 216 are, the larger the force required to rotate the display unit 220.

Figure 4:
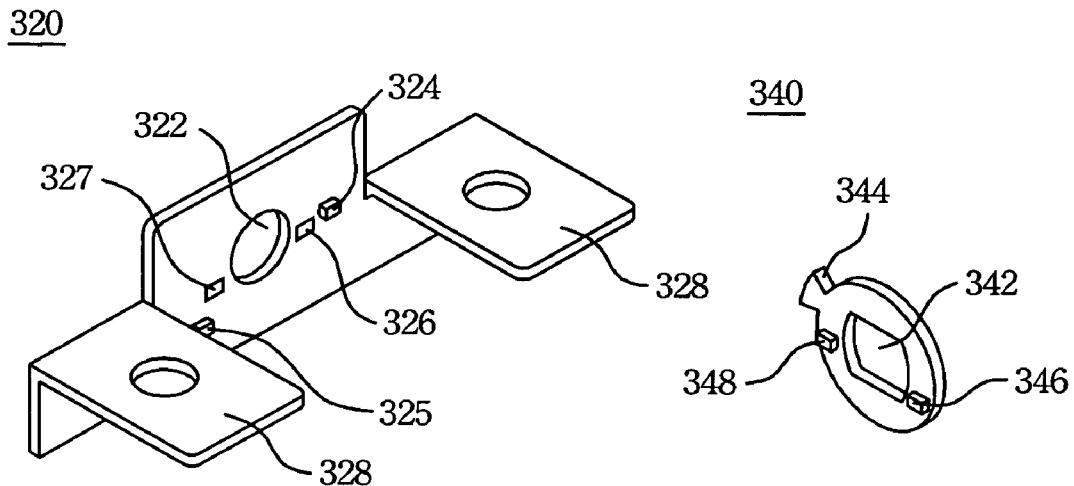
FIG. 4 is a schematic diagram of two members of a pivoting unit in accordance with a preferred embodiment of the present invention.
Figure 5:
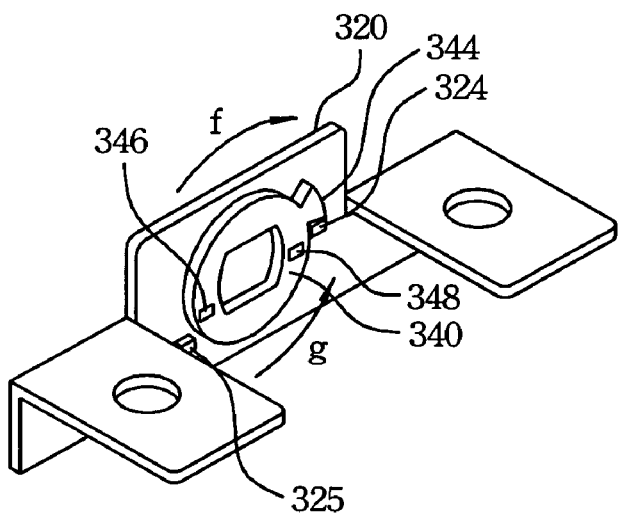
FIG. 5 is an operation diagram of two members of a pivoting unit in accordance with a preferred embodiment of the present invention.

The pivoting unit 216 further includes an angle limiter 340 as shown in FIG. 3. Referring to FIG. 4 and FIG. 5, the angle limiter 340 and the bracket 320 are shown. The angle limiter 340 is ring-shaped with a second hole 342 crossed by the spindle 310, and a stop part 344 at the edge, which is disposed between the elastomer 330 and the gasket 350. The bracket 320 has a first stop 324 and a second stop 325 at the opposite side of the first hole 322. While the angle limiter 340 is rotated by the spindle 310 (along either rotation direction "f" or rotation direction "g"), the stop part 344 would be stopped by the first stop 324 (along the rotation direction "f") or the second stop 325 (along the rotation direction "g") and these two stop positions are the angle (or rotation) limitations of the keyboard device 210 (one position makes the keyboard device 210 face up and the other position makes keyboard device 210 face down).

To emphasize and secure the position, the angle limiter 340 further comprises a first protrusion 346 and a second protrusion 348 disposed around the second hole 342. The bracket 320 further comprises a first notch 326 and a second notch 327 disposed around the first hole 322. Therefore, while the stop part 344 is stopped by the first stop 324 (or the second stop 325), the first protrusion 346 and the second protrusion 348 would fit into the corresponding second notch 327 and the corresponding first notch 326 (or the first protrusion 346 and the second protrusion 348 would fit into the corresponding first notch 326 and the corresponding second notch 327, respectively).

To transmit the signal between the keyboard device 210 and the computer device 200, the interior of the spindle 310 is hollow and electrical wires or cables 312 are placed within. Besides, for further simplicity, short range wireless technology could be utilized to replace the wires or cables. Short range wireless technology includes technology such as WLan, Bluetooth, infrared rays, wireless USB, wireless IEEE 1394, zigbee or UWB (Ultra wideband) and so on.

Figure 6A:
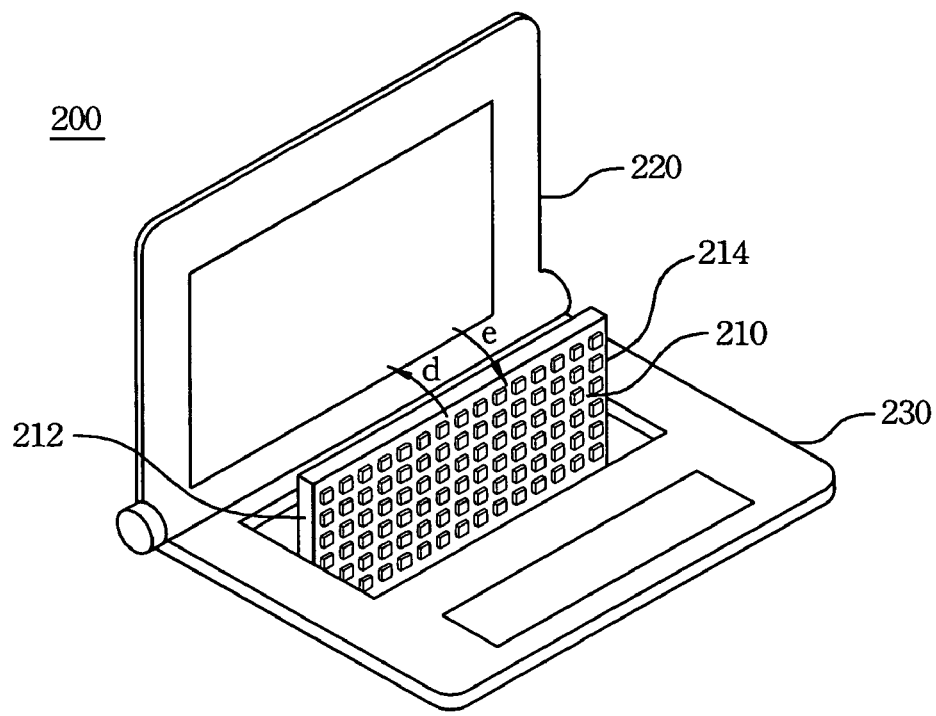
FIG. 6a~6c is a series of continuous operation diagrams of a keyboard device in accordance with a preferred embodiment of the present invention.
Figure 6B:
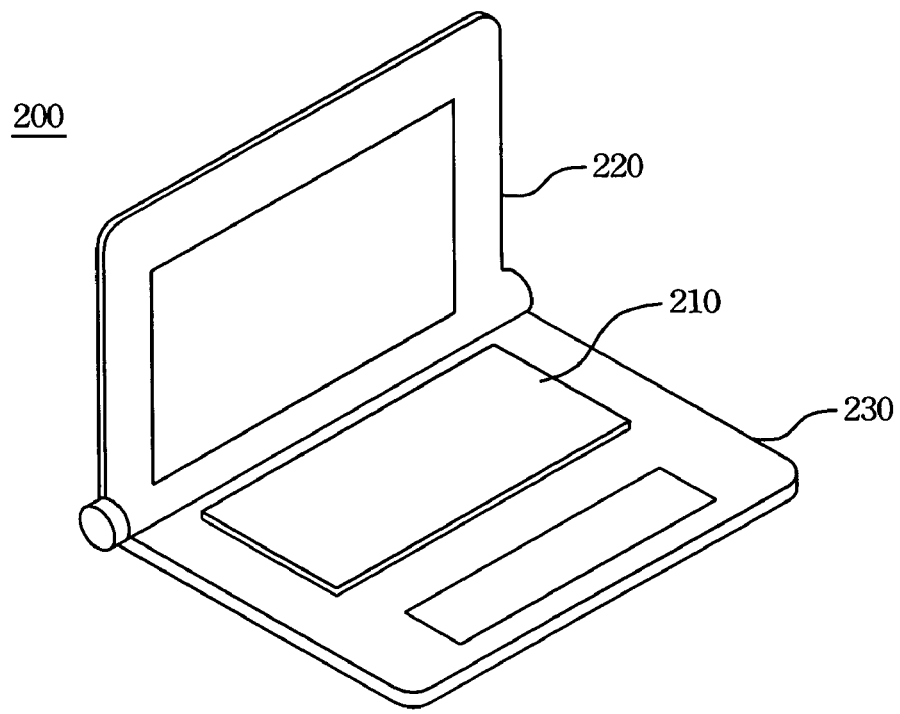
Figure 6C:
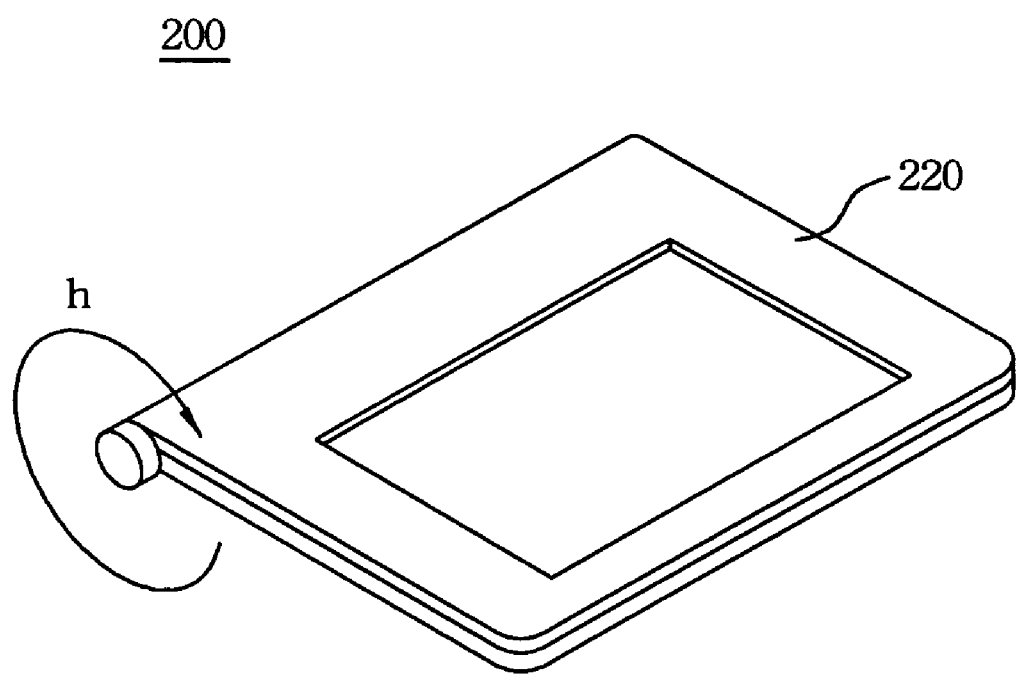

FIG. 6a~6c shows a series of continuous operation diagrams of a keyboard device in accordance with a preferred embodiment of the present invention. First, a user may rotate the display unit 220 along either rotation direction "d" or rotation direction "e" as shown in FIG. 6a until the keyboard device 210 faces downward as shown in FIG. 6b. At the same time, the stop part 344 would be stopped by either the first stop 324 or the second stop 325. Finally, to complete the conversion steps, the display unit 220 is pushed down in the rotation direction "h" to cover the base 230 and the keyboard side of the keyboard device 210.

From the foregoing description, the invention provides easy, simple and intuitive convertible steps for a convertible tablet PC that user doesn't need to remember the preset rotation direction and doesn't need to try the preset rotation direction.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A keyboard device applicable on a computer device, comprising:
    a first side with a first pivoting unit for connecting with a base of the computer device; and
    a second side with a second pivoting unit for connecting with the base,
    wherein the position of the first side is opposite to the position of the second side and the keyboard device is rotatable relative to the base via the first pivoting unit and the second pivoting unit,
    wherein both of the first pivoting unit and the second pivoting unit comprise a fastening member, a bracket, an angle limiter with a stop part at the edge, and a spindle; one end of the spindle is connected with the base and the other end crosses through a first hole of the bracket, an elastomer and a gasket, and are then connected by the fastening member; the angle limiter is disposed between the elastomer and the gasket; the bracket has a first stop and a second stop to stop the keyboard device from rotating; the surface of the angle limiter facing the bracket further comprises a first protrusion and a second protrusion, and the position of the first protrusion is opposite across a second hole of the angle limiter to the position of the second protrusion; and a first notch and a second notch are disposed around the first hole of the bracket.

2. The keyboard device as claimed in claim 1, wherein the angle between the first notch and the second notch is 180 degrees around the first hole and the angle between the first protrusion and the second protrusion is 180 degree around the second hole.

3. The keyboard device as claimed in claim 1, wherein the fastening member is a nut.

4. The keyboard device as claimed in claim 1, wherein the elastomer is a spring.

5. The keyboard device as claimed in claim 1, wherein the spindles are hollow for placing electrical wires for transmitting signals between the keyboard device and the base.

6. A computer device, comprising:
    a display unit;
    a base connected with the display unit electronically having a hollow area; and
    a keyboard device placed in the hollow area, comprising:
        a first side with a first pivoting unit for connecting with the base of the computer device; and
        a second side with a second pivoting unit for connecting with the base,
        wherein the position of the first side is opposite to the position of the second side and the keyboard device is rotatable relative to the base via the first pivoting unit and the second pivoting unit,
        wherein both of the first pivoting unit and the second pivoting unit comprise a fastening member, a bracket, an angle limiter with a stop part at the edge and a spindle; one end of the spindle is connected with the base and the other end crosses through a first hole of the bracket, an elastomer and a gasket, and are then connected by the fastening member; the angle limiter is disposed between the elastomer and the gasket; the bracket has a first stop and a second stop to stop the keyboard device from rotating; the surface of the angle limiter facing the bracket further comprises a first protrusion and a second protrusion, and the position of the first protrusion is opposite across a second hole of the angle limiter to the position of the second protrusion; and a first notch and a second notch are disposed around the first hole of the bracket.

7. The computer device as claimed in claim 6, wherein the computer device is a convertible tablet PC.

8. The computer device as claimed in claim 6, wherein the angle between the first notch and the second notch is 180 degrees around the first hole; and the angle between the first protrusion and the second protrusion is 180 degree around the second hole.

9. The keyboard device as claimed in claim 6, wherein the fastening member is a nut.

10. The keyboard device as claimed in claim 6, wherein the elastomer is a spring.

11. The computer device as claimed in claim 6, wherein the base is a host or a server.

12. The computer device as claimed in claim 6, wherein the display unit is a touch panel.

13. The computer device as claimed in claim 6, wherein the spindle is hollow for placing electrical wires for transmitting signals between the keyboard device and the base.

14. The computer device as claimed in claim 6, wherein a communication between the keyboard device and the base via wireless technology.

* * * * *